United States Patent [19]

Tezuka

[11] 4,380,381
[45] Apr. 19, 1983

[54] CAMERA WITH MOTOR DRIVEN WINDING-UP DEVICE

[75] Inventor: Nobuo Tezuka, Tokyo, Japan

[73] Assignee: Canon Kabushiki Kaisha, Tokyo, Japan

[21] Appl. No.: 318,584

[22] Filed: Nov. 5, 1981

[30] Foreign Application Priority Data

| Nov. 7, 1980 [JP] | Japan | 55-156847 |
| Nov. 7, 1980 [JP] | Japan | 55-156849 |
| Nov. 7, 1980 [JP] | Japan | 55-156850 |
| Nov. 7, 1980 [JP] | Japan | 55-156851 |

[51] Int. Cl.$^3$ .................... G03B 17/38; G03B 17/42
[52] U.S. Cl. .................... 354/173; 354/206; 354/213; 354/214; 354/268
[58] Field of Search ............ 354/171, 173, 204–206, 354/212–215, 217, 218, 268; 242/71.4–71.6

[56] References Cited

U.S. PATENT DOCUMENTS 3,169,460  2/1965  Winkler et al. .................... 354/173
4,279,490  7/1981  Mashimo et al. .................... 354/173

Primary Examiner—William B. Perkey
Attorney, Agent, or Firm—Toren, McGeady and Stanger

[57] ABSTRACT

A movable member in a camera is arranged to start moving in response to termination of a shutter operation. By way of this movable member, a clutch mechanism for transmitting driving torque of an electric motor to a film winding-up mechanism is rendered operative, and a control switch for the motor is also changed over. This initiates a film winding-up operation by the motor after the exposure has been completed.

10 Claims, 8 Drawing Figures

CAMERA WITH MOTOR DRIVEN WINDING-UP DEVICE

BACKGROUND OF THE INVENTION

1. Field of the Invention

This invention relates to motor driven film winding-up and shutter charging devices for cameras, and more particularly to motor driven winding-up devices for cameras provided with a clutch mechanism operating to cut off the supply of driving torque from the driving source to the film winding-up system, when the exposed film is wound-up by the length of one frame.

2. Description of the Prior Art

In the past, in the art of motor driven winding-up devices for cameras, there have been proposed a wide variety of one-frame film advancement controls. For example, when the exposed film is advanced by one frame, a signal is taken out by utilized the perforations provided in the film. Then, it is by this signal that the clutch mechanism is rendered inoperative so that driving torque from an electric motor or like driving power source is no longer transmitted to a film transport system. Therefore, such motor driven winding-up device has a requirement that, in order to allow for the recurrent film winding operation after the completion of each exposure, the clutch mechanism be coupled again in itself, rendering it possible to transmit motion of the driving power source to the film transport system. According to the prior art, therefore, the clutch mechanism is arranged to recouple either in response to depression of the release button, or by utilizing the action of the shutter operating member. With such arrangements, however, in the former case, the depressing force of the release button must be increased and, therefore, when taking a photograph, the photographer will experience some discomfort. Further, in application to electromagnetic release cameras where only an electrical switch suffices for initiation of a camera operation, it is required that the above-described transmission control in mechanical form be provided in isolation, thereby giving rise to a drawback that the usefulness of the electromagnetic release is diminished. Also, in cameras operating with the torque supply from a driving power source such as a motor, the timing of the start of rotation of the motor with the aforesaid recoupling must be strictly adjusted by the use of complicated means. Next, in the latter case where the aforesaid recoupling is effected by making use of the action of the shutter operating member, since the kinetic energy of the shutter member is generally small, the range of work of the shutter operating member except for the recoupling of the clutch mechanism is necessarily very limited. Since a motorized camera has, for example, a circuit changeover switch, and this switch also must be actuated, a drawback results in that there is a great loss in the accuracy and reliability of control of the operation of these parts. This tendency is so prominent, particularly in lens shutters (including so-called semi-open type shutters) where the kinetic energy is very small, that an increase in the work of the shutter operating member will call for an influence on the aperture characteristics of the shutter blades. Thus, it has been very difficult to make the shutter operating member so as to serve as an actuator for the various members and the switch.

Turning to the camera of the type having such a motor driven winding-up device, in more detail, where the driving torque from the electric motor or other suitable driving source is transmitted to a spool on which the film is wound-up, and when the film is advanced by one frame, the clutch mechanism is cut off to stop the film from being further wound-up. However, the following problem further arises. That is, in the conventional practice, such camera when switched from the winding-up to the rewinding mode is made compatible with a smooth rewinding operation, by rendering the aforesaid clutch mechanism inoperative. Then, when switching from the rewinding to the winding mode, this switching operation is followed automatically by the clutch mechanism returning to the operative position. Therefore, the stoppage of the film in the rewinding operation results in the restraint of the spool from further rotation in the reverse direction. Then, if the leader of the film is yet left on the spool, it is very troublesome to detach the film from the spool. With such situation overlooked, when the photographer is unloading the cartridge from the camera, the exposed film often will be pulled out and fogged.

SUMMARY OF THE INVENTION

With the foregoing in mind, it is a first object of the present invention to provide a motor driven winding-up device for a camera capable of controlling the film winding operation with high accuracy and reliability, by providing a member arranged so that upon termination of an exposure operation of the camera, the member initiates an action which causes the clutch mechanism to be recoupled, and the switch to be changed over in position.

A second object of the invention is to provide a motor driven winding-up device for a camera, which is capable, upon use of the aforesaid member, of prohibiting actuation of the camera release at a time during the film winding or rewinding operation by using simple means.

A third object of the invention is to provide a motor driven winding-up device for a camera, which is provided with a holding member for assuredly maintaining the aforesaid clutch mechanism in the inoperative position when the camera is switched from the rewinding to the winding mode, whereby loading and unloading of the flim cartridge is made easy.

DETAILED DESCRIPTION OF THE PREFERRED EMBODIMENTS

The present invention will next be described in greater detail in connection with embodiments thereof by reference to the drawings.

Figure 1:
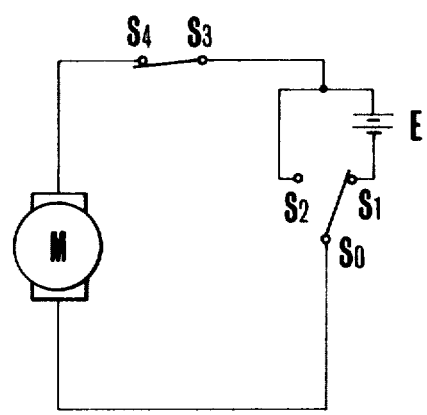
FIG. 1 is an electrical circuit diagram illustrating a motor drive circuit.

FIG. 1 shows an electric motor M, an electrical power source or battery E, and switch contacts $S_0$–$S_4$. That is, in FIG. 1, when the switch contacts $S_3$ and $S_4$ are in a conducting state and when the switch contacts $S_0$ and $S_1$ are in a conducting state, the motor M rotates, and this rotation of the motor M results in winding-up the exposed film and charging the shutter. Then, when the camera is ready for making the next exposure, as the switch contacts $S_0$ and $S_2$ are brought into engagement with each other, as will be described more fully later, the current supply to the motor M is cut off, while the ends of the winding of the motor M are short-circuited to brake the motor M. It is noted that the switch contacts $S_3$ and $S_4$ are arranged to be open when a release lever is pushed down.

Figure 2:
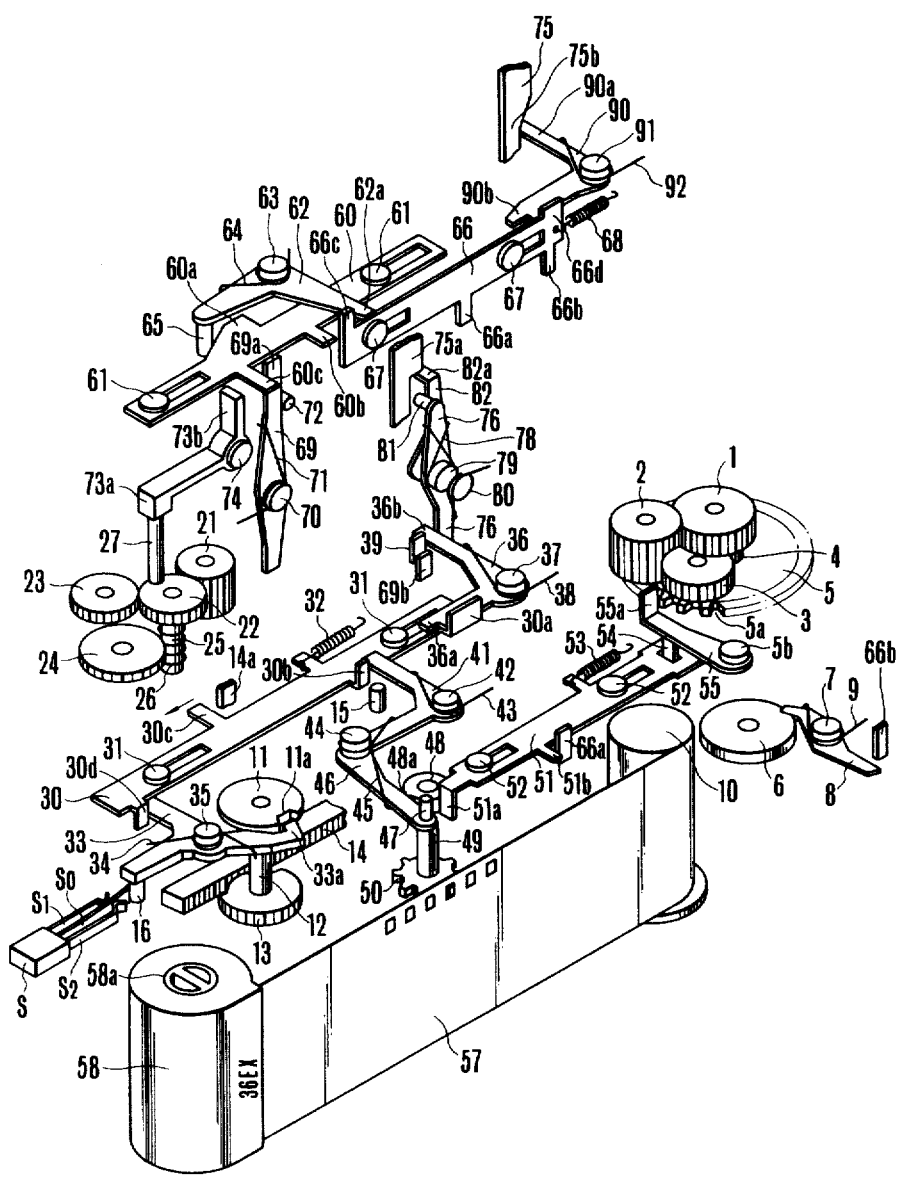
FIG. 2 is an exploded perspective view of one embodiment of a motor driven winding-up device for a camera according to the present invention.

Next, in FIG. 2, there is shown one embodiment of the invention, including a gear 1 to which motion of the motor M is transmitted through a gear train (not shown). Rotatably mounted on a shaft (not shown) of the gear 1 are a gear 4 driving a spool 10 to rotate through a gear 6, and a clutch disc 5 having index grooves 5a provided in the periphery thereof and cooperating with an upwardly standing portion 55a of a clutch lever 55. This clutch disc 5 has two axles supported thereon, about one of which is a freely rotatable gear 2 meshing with the gear 1 and a gear 3, and about the other of which is the freely rotatable gear 3 meshing with the gears 2 and 4, these parts constituting a planetary gearing mechanism. This planetary gearing mechanism, with the clutch disc 5 engaging at one of the index grooves 5a with the upwardly standing portion 55a of the clutch lever 55, because of the load of the clutch disc 5 exceeding the load of the gear 4, drives the takeup spool 10, thus functioning as a clutch mechanism. A pawl lever 8 is urged by a spring 9 to turn about a pivot pin 7 in a counterclockwise direction, and is arranged upon engagement in a recessed portion of a gear 6 to prevent reverse rotation thereof. In more detail, if this pawl lever 8 is not provided, it occurs that when the clutch lever 55 is disengaged from the clutch disc 5, the tension of a film 57 in the rewinding direction drives the takeup spool 10 in the reverse direction with the result that the separations between the successive two frames are made uneven. To avoid this, use is made of the pawl lever 8 here.

The driving torque of motor M is transmitted not only to the gear 1, but also to a gear 21 through a gear train (not shown). This gear 21 meshes with a gear 22 which is made slidingly movable on an axle 25, and which is urged by the bias force of a spring 26 to normally engage with a gear 23. The gear 23 transmits the driving torque of motor M through a gear train (not shown) to a rotary shaft 12. Next, a rack 14 engages with a cutout gear 13 fixedly mounted on the rotary shaft 12, this rack 14 having an extension 14a which is arranged to engage with a pawl portion 30c of a slide 30 when the cutout gear 13 is rotated in a counterclockwise direction by the motor M, and being arranged upon movement in a direction indicated by an arrow through a predetermined distance to charge the shutter and the like. A changeover lever 33 is urged by a spring 34 to turn about a pivot pin 35 in a counterclockwise direction, one of the arms of which fixedly carries an actuator pin 16 for a switch S. Another arm of this changeover lever 33 has a projection 33a formed in the end portion thereof which cooperates with a recessed portion 11a of a cam disc 11 fixedly mounted on the rotary shaft 12. The other or third arm engages with a pawl portion 30d of the slide 30. The movable switch contact $S_0$ shown in FIG. 1 is positioned adjacent the actuator 16 so that it engages the switch contact $S_1$ when the projection 33a of the changeover lever 33 lies out of the recessed portion 11a of the cam disc 11, and it engages the switch contact $S_2$ when the projection 33a is in the recessed portion 11a.

The slide 30 is made sliable along support pins 31, and is urged by a spring 32. Provided near the right end of this slide 30 is a latching lever 36 having a cutout 36a for engagement with a pawl portion 30a of the slide 30. When the slide 30 has moved to the leftmost position, the pawl portion 30a engages the cutout 36a, thereby the slide 30 is latched therein. The latch lever 36 is urged by a spring 38 to turn about a pivot pin 37 in a counterclockwise direction and is arranged to turn in a clockwise direction against the force of the spring 38 when another arm 36b is pushed by a shutter operating member 39.

Next, an actuator lever 41 is pivoted at a pin 42, an arm of which extends into the path of movement of an extension 30b of the slide 30, and antoerh arm which carries a pivot pin 44. A spring 43 urges the actuator lever 41 to turn about the pivot pin 42 in a counterclockwise direction. Rotation of the actuator lever 41 by the bias force of this spring 43 is limited by a stopper pin 15 when the arm of the actuator 41 is not in contact with the extension 30b of slide 30. Pivotally supported on the pin 44 is a control lever 46. This control lever 46 is urged by a spring 45 to turn about the pivot pin 44 in a counterclockwise direction, and fixedly carries a control pin 47 on the free end thereof. A slide plate 51 is slidable along support pins 52 and has a pawl portion 51a for transmission of the action of the control pin 47, and an extension 51b for engagement with a projection 66a of a rewinding control member 66. This slide plate 51 has a transversely elongated slot through which a transmission pin 54 supported on the clutch lever 55 extends, so that when the slide plate 51 is moved against the bias force of a spring 53, the clutch lever 55 is caused to turn about the pivot pin 56 in the counterclockwise direction.

A cam 48 is fixedly mounted on a support shaft 49 and provided with a hump 48a on its periphery to push the control lever 46 at a side thereof. Also, fixedly mounted on this support shaft 49 is a sprocket 50 for engagement with the perforations of the film 57. Thus the sprocket 50 and cam 48 rotate in unison. It is noted that when the film 57 is wound-up by one frame on the takeup spool 10, the sprocket 50 rotates one revolution.

A pivot pin 79 rotatably supports a lock lever 82 having a projection 82a for preventing downward movement of a release rod 75 by engagement with its cutout 75a, and an interconnection lever 76 having a pin 81 on one arm thereof to abut on the side edge of the lock lever 82, the opposite arm of which is in contact with the side surface of the arm 36b of the latch lever 36. A spring 80 urges the interconnection lever 76 in a clockwise direction. Further, provided between the interconnection lever 76 and the lock lever 82 is a spring 78 so that when the interconnection lever 76 turns in a counterclockwise direction, this rotative motion is transmitted to the lock lever 82, wherein both the levers can rotate in unison. The release rod 75 with its cutout 75a when engaging the projection 82a of the lock lever 82 is restrained from downward movement, but becoming so-called "release locked". Otherwise, when the release rod 75 is depressed, the switch contacts $S_3$ and $S_4$ shown in FIG. 1 are opened, rendering the motor M inoperative, and initiating an operation of exposure mechanisms such as the shutter (not shown).

A rewinding control member 60 is slidable along support pins 61. This rewinding control member 60 is provided with a cam portion 60a cooperating with a pin 65 supported on one arm end of an actuating lever 62, a pawl portion 60b for engagement with an arm 69a of a release lever 69 when said rewind control member 60 is slid to a rewinding mode setting position, and another pawl portion 60c for engagement with an arm end 73b of a changeover lever 73. The actuating lever 62 is urged by a spring 64 to turn about a pivot pin 63 in a counterclockwise direction, and its other arm engages a pawl portion 66c of a slide 66 which is slidable along support pins 67, so that when the actuating lever 62 is rotated in a clockwise direction, the slide 66 is moved against the bias force of a spring 68. The slide 66 is provided with extensions 66a and 66b which are in contact with a pawl portion 51b of the slide plate 51 and the tail of the pawl lever 8, respectively. A pawl portion 66d of the slide 66 is arranged to engage with a cutout 90b of a latch lever 90 when the slide 66 moves against the bias force of the spring 68. This latch lever 90 is urged by a spring 92 to turn about a pivot pin 91 in a counterclockwise direction, and has one arm 90a which is in contact with a camming surface of the release rod 75 so that when the release rod is moved downwards, the latch lever 90 rotates in a clockwise direction, causing disengagement of its cutout 90b from the pawl portion 66d of the slide 66. Next, a communication pin 27 contacts the end portion 73a of the changeover lever 73. Then the changeover lever 73 turns about the pivot pin 74, the communication pin 27 is actuated, moving the gear 22 to a lower position where it meshes with the gear 24. It is noted that the gear 24 transmits the driving torque of motor M to a supply spool hub of the cartridge 58 through a gear train (not shown). Further, the rewind control member 60 has its pawl portion 60b engaging the release lever 69 which is urged by a spring 71 to turn about a pivot pin 70 in a clockwise direction and which has an arm 69b capable of abutting against the latch lever 36. A stopper pin 72 limits clockwise movement of this release lever.

Next, an explanation is given of the operation of the winding-up device of such construction.

In the position illustrated in FIG. 2 where an exposure is just completed, the changeover lever 33 is in a clockwisemost position by the pawl portion 30d of the slide 30, so that the switch actuator pin 16 brings the switch contacts $S_0$ and $S_1$ into engagement with each other. Therefore, the motor M starts to rotate, and the gears 1 and 21 are driven to rotate. Since, at this time, one of the index grooves 5a of the clutch disc 5 engages the upward standing portion 55a of the clutch lever 55, the driving torque is transmitted to the gear 4, and, therefore, the takeup spool 10 starts to wind-up the film 57. On the other hand, the driving torque transmitted to the gear 21 is further transmitted through the gears 22 and 23 to the rotary shaft 12, starting rotation of the cutout gear 13. As this cutout gear 13 rotates, the rack 14 is moved in a direction indicated by an arrow in FIG. 3, while charging the shutter. Therefore, the shutter operating member 39 also starts to move in the same direction indicated by an arrow. Then, the projection 14a of this rack 14 comes into contact with the pawl portion 30c of the slide 30 and drives the slide 30 also to move in the same direction. On the other hand, as the film 57 is being wound-up on the takeup spool 10, the sprocket 50 also rotates in the counterclockwise direction along with the cam 48 also rotating in the counterclockwise direction, so that the hump 48a of the cam 48 is moved away from the side surface of the control lever 46, permitting the control lever 46 to turn about the pivot pin 44 in the counterclockwise direction under the action of the spring 45.

Figure 3:
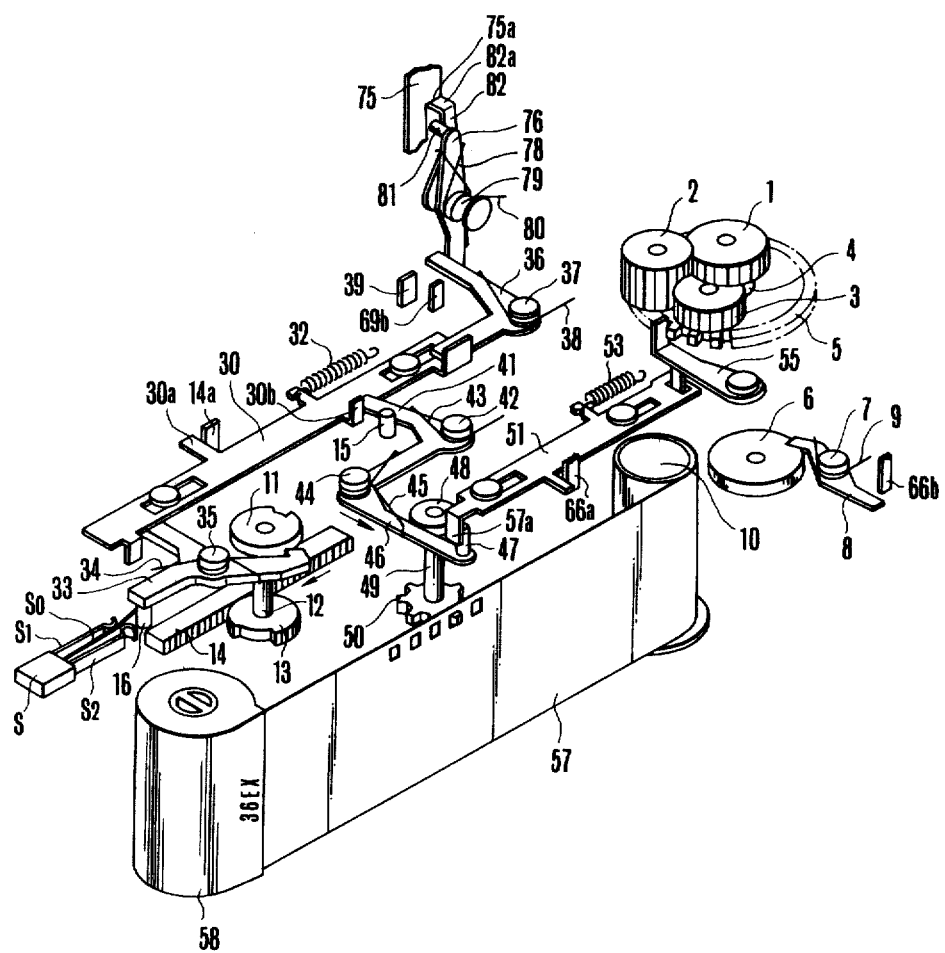
FIG. 3 is a similar view of the FIG. 2 embodiment of an operative position where a winding operatin is under progress.

Such movement of the slide 30 also causes the actuating lever 41 to turn in the counterclockwise direction under the action of the spring 43 until it abuts on the stopper pin 15, as the pawl portion 30b of the slide 30 is disengaged from the actuating lever 41 as shown in FIG. 3. Therefore, since the control lever 46 is pivotally mounted on the end of one arm of the actuating lever 41, as the actuating lever 41 turns, the control lever 46 is shifted in a direction indicated by an arrow in FIG. 3. Therefore, the control pin 47 on the free end of the control lever 46 is then caused to round the leg 51a of the slide plate 51 and to enter the back side thereof as shown in FIG. 3.

Figure 4:
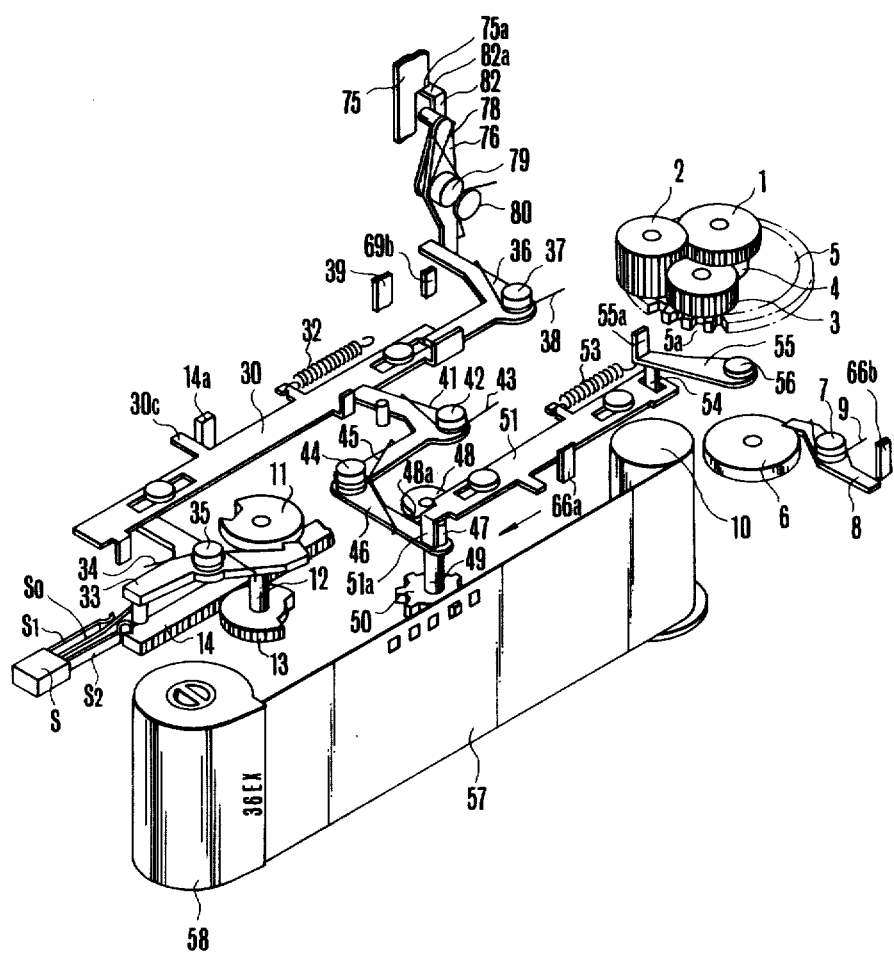
FIG. 4 is a similar view of the FIG. 2 embodiment in another operative position where one-frame advancement is completed.
Figure 5:
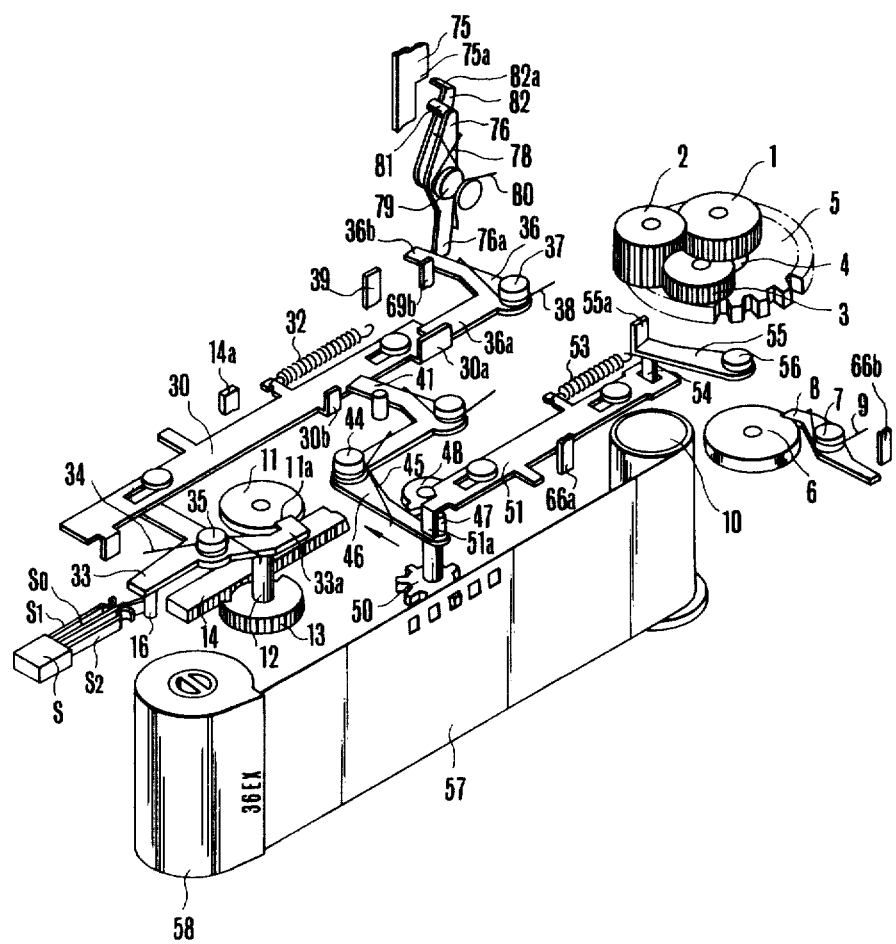
FIG. 5 is a similar view of the FIG. 2 embodiment in another operative position where the shutter is charged.

Thereafter, as the winding operation proceeds, when the film 57 is advanced through the length of one frame, the sprocket 50 and cam 48 rotate one revolution, so that the hump 48a of the cam 48 operates again on the control lever 46. Then, the control lever 46 is driven to turn about the pivot pin 44 in the clockwise direction, while simultaneously moving the slide plate 51 in the direction indicated by an arrow in FIG. 4, by way of the control pin 47 against the bias force of the spring 53. As the slide plate 51 moves, the clutch lever 55 is caused to turn about the pivot pin 56 in the counterclockwise direction through the transmission pin 54, thus disengaging the upward standing portion 55a from the index groove 55a. At this point in time, the driving torque from the motor M is no longer transmitted to the takeup spool 10, and the film 57 gets stopped from further being wound-up. On the other hand, the cutout gear 13 still remains rotating. Therefore, the rack 14 continues to move the shutter operating member 39 and slide 30. When storing of power on the shutter operating member 39 and slide 30 has been completed, that is, when the shutter has been charged, as shown in FIG. 5, the cutout of the gear 13 is aligned with the rack 14, and the rack 14 is then returned to the initial position by a spring (not shown). Also, at this point in time, the pawl 33a of the changeover lever 33 engages the notch 11a of the cam disc 11 as shown in FIG. 5, while being turned about the pin 35 in the counterclockwise direction by the spring 34. As a result, the switch actuating pin 16 opens the so far closed switch contacts $S_1$ and $S_0$, and, in this case, also closes the switch contacts $S_0$ and $S_2$. As has been mentioned before, therefore, the motor M is thus rapidly stopped.

When the slide 30 reaches the leftmost position illustrated in FIG. 5, the pawl portion 30a of the slide 30 is engaged in the cutout 36a of the latch lever 36. This permits the latch lever 36 to turn about the pivot pin 37 in the counterclockwise direction by the spring 38. As this latch lever turns, the interconnection lever 76 that has its one arm 76a always engaged with the latch lever 36 is driven to turn about the pivot shaft 79 in the clockwise direction by the bias force of the spring 80. Since, as has been mentioned above, the interconnection lever 76 and lock lever 82 are formed so as to turn in the clockwise direction together with each other by means of the pin 81, as the latch lever 76 turns, the lock lever 82 also turns in the clockwise direction as shown in FIG. 5. Therefore, the tooth 82a of the lock lever 82 that has so far been in the range of action of the release rod 75 is retracted. That is, at this point in time (at the time when the winding operation is terminated), the release rod 75 is set free and therefore becomes capable of being depressed.

Next, when the release button (not shown) is depressed to actuate a camera release, the shutter is opened. Then, when the shutter is closed, as the shutter operating member 39 runs down from the position illustrated in FIG. 5 to that illustrated in FIG. 2, the latch lever 36 is pushed at one end 36b thereof, while being turned about the pivot pin 37 in the clockwise direction. Accordingly, the aforesaid engagement of the pawl portion 30a of slide 30 and the cutout 36a is taken out. This causes the slide 30 to start moving toward the position illustrated in FIG. 2. Furthermore, such rotative movement of the latch lever 36 also causes counterclockwise movement of the interconnection lever 76 which is then transmitted through the spring 78 to the lock lever 82. Therefore, at this time, if the release rod 75 is released from depression, the pawl 82a of the lock lever 82 enters the cutout of the release rod 75 to lock the release button again. On the other hand, such rightward movement of the slide 30 causes the actuating lever 41 to turn about the pivot pin 42 in the clockwise direction in engagement with the pawl portion 30b, which in turn causes the control lever 46 with its pivot pin 44 on the end of the other arm of the actuating lever 41 to move in a direction indicated by an arrow in FIG. 5 until the control pin 47 disengages from the pawl portion 51a of the slide plate 51. Then, the slide plate 51 is returned to the position illustrated in FIG. 2 by the bias force of the spring 53, and the upward standing portion 55a of the clutch lever 55 is again brought into engagement with one of the index grooves 5a of the clutch disc 5. That is, the transmission of the driving torque of the motor M to the takeup spool 10 is established again. Such movement of the slide 30 also causes the changeover lever 33 to turn in the clockwise direction by the pawl portion 30d of the slide 30 so that the projection 33a is disengaged from the notch 11a of the cam disc 11, and the switch contacts $S_0$ and $S_1$ are closed by the switch actuating pin 16. Thus, all the portions of the apparatus have returned to their positions illustrated in FIG. 2, and the next cycle of winding operation of the film 57 is initiated.

Now assuming that clockwise movement of the latch lever 36 by the shutter operating member 39 occurs when the release rod 75 is left depressed, then the lock lever 82 cannot turn in unison with the interconnection lever 76. This is because the cutout 75a of the release rod 75 is not aligned with the tooth 82a of the lock lever 82 so that counterclockwise movement of the lock lever 82 is retained. In this case, while storing power on the spring 78, the interconnection lever 76 only is turned. And, when the force acting to depress the release rod 75 is removed, the power stored on the spring 78 drives the lock lever 82 to turn in the counterclockwise direction. Thus, the release rod is locked. It is noted that, in this case, though the switch contacts $S_0$ and $S_1$ are closed due to the slide 30, and since the switch contacts $S_3$ and $S_4$ are open as the release rod 75 is depressed, the motor M is not energized unless the release rod 75 is released from the depression. Thus, the camera is incapable of unintentional initiation of a new winding operation of the film 57.

The foregoing explanation has been made in connection with the case where the camera is loaded with the film 57. Even in a case where the film 57 is omitted, the camera operates in the same manner as above, except that the sprocket 50 and the cam 48 do not rotate.

Figure 6:
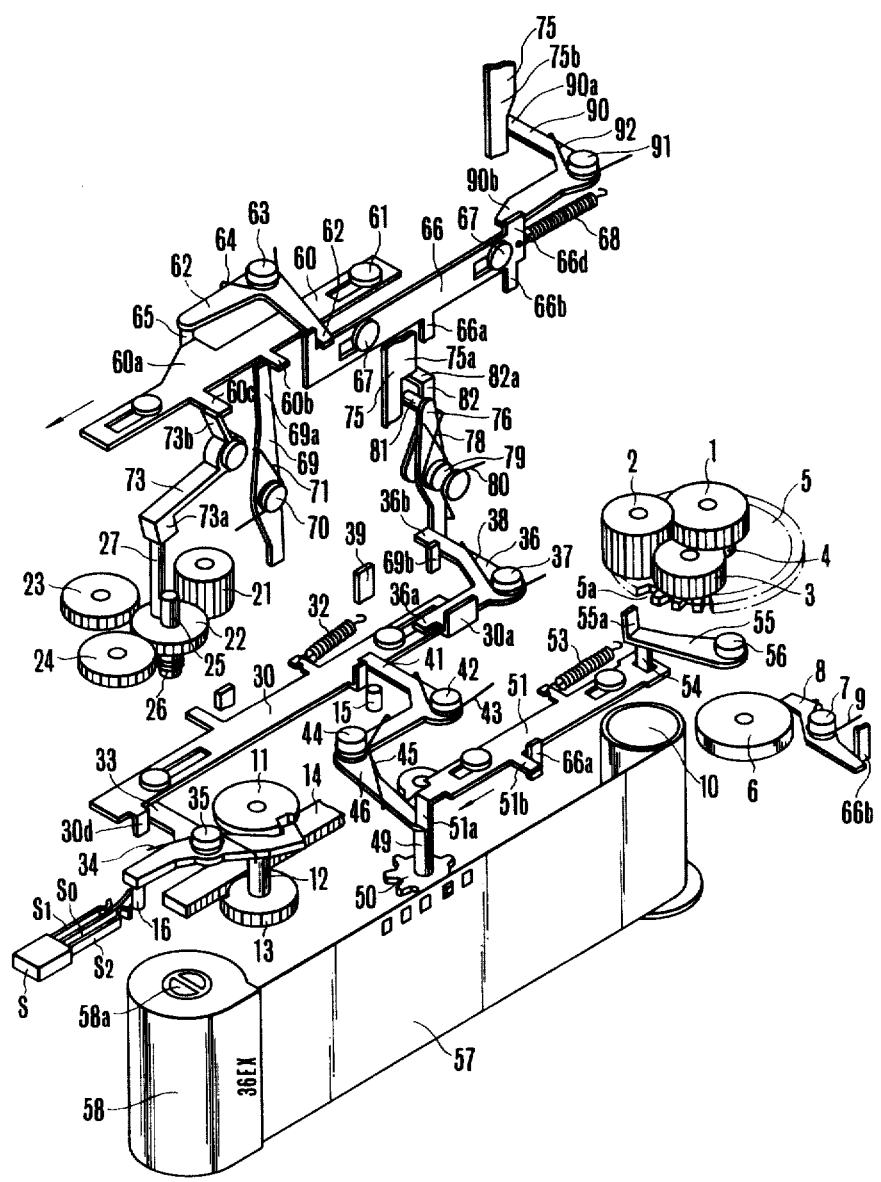
FIG. 6 is a similar view of the FIG. 2 embodiment in another operative position where the film is rewound.

The next explanation is given for the switching operation from the FIG. 5 position where the film winding operation is terminated, to a position where the exposed film 57 is rewound into the cartridge 58. When the rewinding control member 60 is moved leftwards to a position illustrated in FIG. 6, the camming portion 60a of the rewind control member 60 pushes the pin 65 on the actuating lever 62, so that the actuating lever 62 is turned about the pivot pin 63 in the clockwise direction. Such movement of the actuating lever 62 causes the slide 66 to slidingly move in a direction indicated by an arrow, in engagement at the pawl portion 66c with the lever end 62, which, in turn cases both the slide plate 51 with its pawl portion 51b engaging the extension 66a, and the pawl lever 8 with its tail engaging the extension 66b, to be actuated. That is, the movement of the slide 66 results in the disengagement of the upward standing portion 55a of the clutch lever 55 from the index grooves 5a of the clutch disc 5, and also in the disengagement of the pawl lever 8 from the gear 6. Thus, the takeup spool 10 is set freely rotatable. Since the rewind control member 60 is provided with the pawl portion 60c, when said member is moved to the left, the pawl portion 60c abuts on one end of the changeover lever 73 and then turns the changeover lever 73 about the pivot pin 74 in the counterclockwise direction. This causes the gear 22 to be moved along the axle 25 through the intermediary of the communication pin 27 until it engages the gear 24. Therefore, the driving torque of the motor M is made transmittable through the gear train (not shown) to the supply spool in the cartridge 58. Since the rewind control member 60 has the pawl portion 60b, when said member moves, the release lever 69 is turned about the pivot pin 70 in the counterclockwise direction. This motion of the release lever 69 is transmitted through the end portion 69b to the latch lever 36, so that the latch lever 36 is turned from the position of FIG. 5 to the clockwise direction. Therefore, the interconnection lever 76 and lock lever 82 are caused to turn in the counterclockwise direction. Then, the release lever 75 engages the tooth 82 of the lock lever 82, thus being locked. On the other hand, as the latch lever 36 turns, the engagement of the cutout 36a of the latch lever 36 with the pawl portion 30a of the slide 30 is taken out, permitting the slide 30 to start moving. As a result, the changeover lever 33 is turned to close the switch contacts $S_0$ and $S_1$, and the motor M starts to rotate. Thus, rewinding of the film 57 is carried out.

Another function of the slide 66 will now be explained. As the actuating lever 62 moves the slide 66 against the force of the spring 68, when the slide 66 nears the terminal end of movement, the pawl portion 66d of the slide 66 engages the cutout 90b of the latch lever 90. The extensions 66a and 66b of the slide 66 remain unchanged in position despite the fact that the actuating lever 62 returns to the initial position, thus functioning as holders for the slide plate 51 and pawl lever 8. In other words, after the rewinding has been completed, when the rewind control member 60 is returned to the initial position, the camera is switched to the winding mode where the gear 22 engages the gear 23 again, and the end of the lower arm 69b of the release lever 69 is retracted from the path of movement of the end portion 36b of the latch lever 36.

But, the slide 66 is latched by the lever 90 so that, as has been mentioned above, the engagement of the clutch lever 55 with the clutch disc 5, and the engagement of the pawl lever 8 with the gear 6, are left taken out. Therefore, the takeup spool 10 remains freely rotatable. It is also noted that, as will be evident from FIG. 6, the switch contacts $S_0$ and $S_1$ are closed, and, therefore, the motor M is energized to move the slide 30 against the bias force of the spring 32. Then the tooth 82a of the lock lever 82 is disengaged from the cutout 75a of the release rod 75, and the depression of the release rod 75 becomes possible. Therefore, after the cartridge 58 is exchanged, the photographer will depress the release rod 75, so that the latch lever 90 is disengaged from the slide 66. Thus, the pawl 55a of the clutch lever 55 engages the clutch disc 5, and the pawl lever 8 engages the gear 6.

Figure 7:
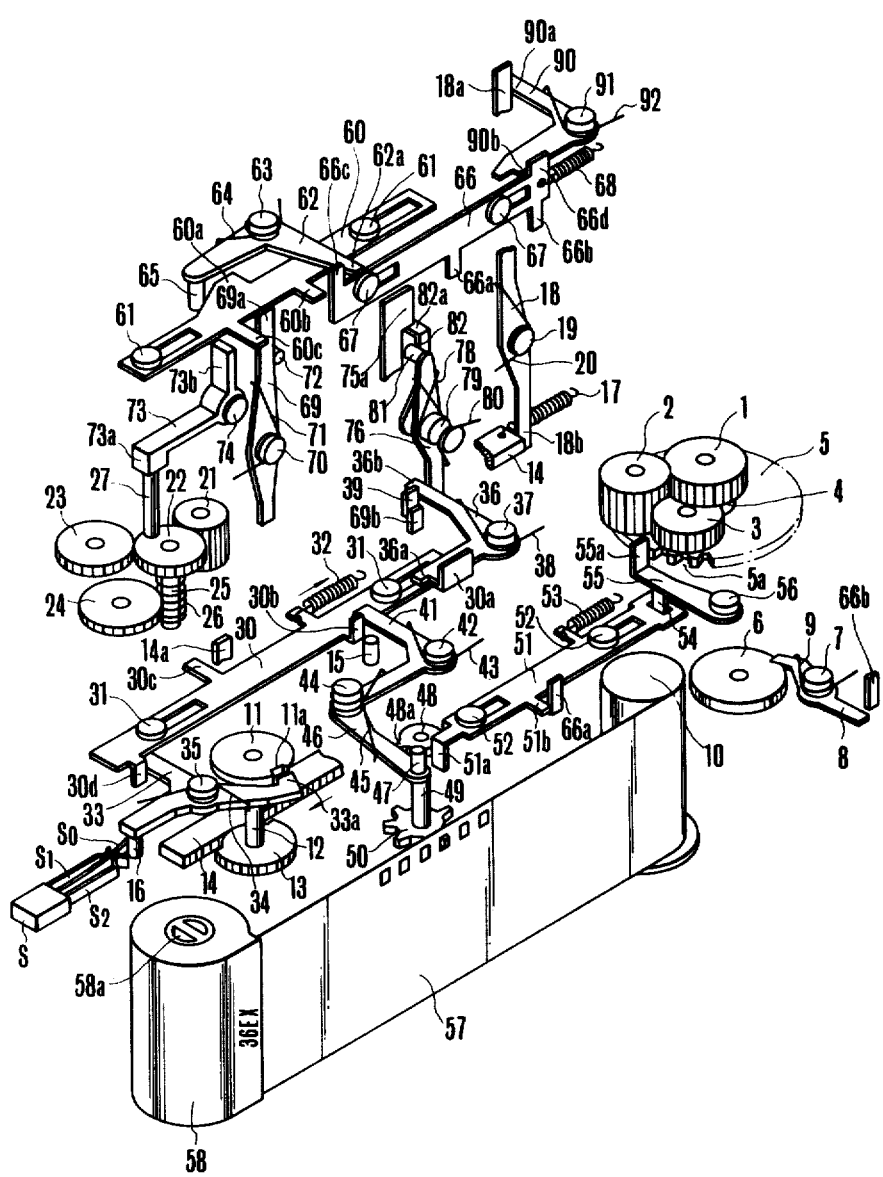
FIG. 7 is an exploded perspective view of another embodiment of the invention.

Next, FIG. 7 shows another embodiment of the present invention. In this drawing, an actuating lever 18 is pivotally supported on a pin 19 and urged by a spring 20 to turn in a clockwise direction. This actuating lever is arranged so that one end 18a engages the latch lever 90, and the opposite end 18b is engageable with the rack 14. A spring is provided for urging the rack 14. That is, this embodiment is different from the first embodiment where the stopping of the rewinding operation is followed by the manual release of the slide 66 from engagement with the latch lever 90 by depressing the release rod 75, in that such release from engagement is automatically effected.

Figure 8:
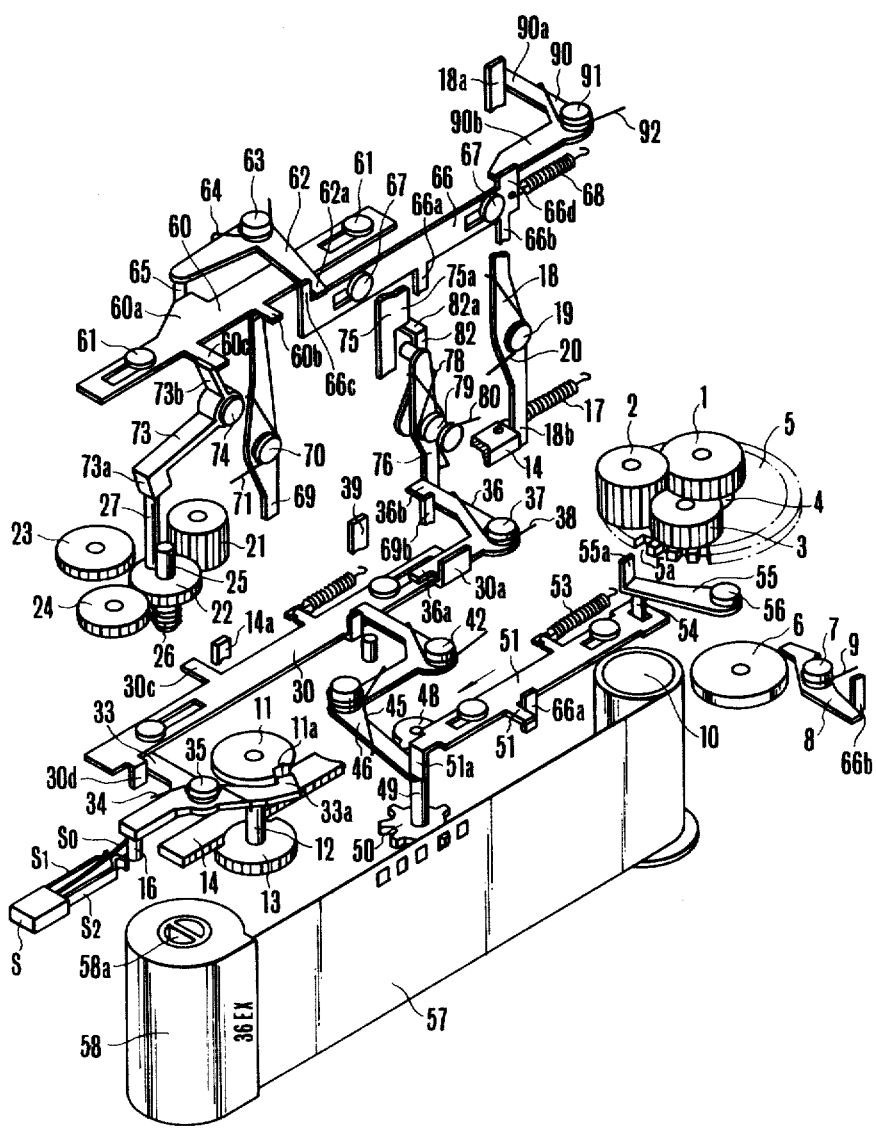
FIG. 8 is a similar view of the FIG. 7 embodiment of an operative position where the film is rewound.

Since, in this embodiment, the construction and arrangement of the other parts and the winding and rewinding operations are similar to those in the above-described embodiment, further recitation is not given here. Then, in this embodiment, when switching the camera from the rewinding to the winding mode, the photographer returns the rewind control member 60 from the position of FIG. 8 to the position of FIG. 7. Then, the release lever 69 is turned by the bias action of the spring 71, so that its one end portion is retracted from the path of movement of the latch lever 36, and the changeover lever 73 also is taken out of the contact with the pawl portion 60c of the rewind control member 60. Then, the gear 22 is moved upwards by the bias force of the spring 26 to engage the gear 23. Since, at this time, the slide 30 is in the position illustrated in FIG. 8, and the switch actuating pin 16 supported on the changeover lever 33 holds the switch contacts $S_0$ and $S_1$ in the closed condition, the motor M still remains rotating. Therefore, as the gear 22 has moved away from the gear 24 under the action of the bias spring 26, when an effective engagement of the gear 22 with the gear 23 occurs, the cutout gear 13 is supplied with the driving torque from the gear 23 to start rotation in the counterclockwise direction. Then, the rack 14 is moved against the force of the spring 17, permitting the actuating lever 18 to turn in the clockwise direction. Such movement of the actuating lever 18 causes the latch lever 90 to turn in engagement with the lever end 18a against the bias force of the spring 92, so that the cutout 90b of the latch lever 90 is disengaged from the pawl portion 66d of the slide 66. At this time, the slide 66 that has so far been held in the position of FIG. 8 even after the rewind control member 60 was changed over to the winding mode, starts to move and returns the members 66a and 66b to the positions of FIG. 2. Then, the clutch lever 55 goes to engages the clutch disc 5 again, and the pawl lever 8 also moves to engage the gear 6 again. Thus, the transmission of the driving torque of the motor M through the gear 4 to the takeup spool 10 is reestablished.

It should be pointed out here that at the same time of the aforesaid start of movement of the rack 14, the slide 30 also is driven to move by the rack 14 with its extension 14a engaging the projection 30c of the slide 30 against the bias force of the spring 32, while permitting the changeover lever 33 to turn in the counterclockwise direction, so that the switch contacts $S_0$ and $S_1$ are taken out of contact with each other. Therefore, just when the transmission of the driving torque to the takeup spool is established, the motor M is deenergized, and the camera as a whole takes the winding mode.

As has been described above in great detail, the present invention provides a member, movement of which is started by the shutter driving member when the shutter is closed, and which is arranged upon movement to control the recoupling operation of the clutch mechanism for transmitting the driving torque to the film winding system and also the electrical power supply to the driving source such as an electric motor, thereby giving the advantage that accuracy and reliability of these controls can be remarkably improved. Another advantage is that even when applied to lens shutters where the kinetic energy of the shutter driving member is extremely small, the operation of the various portions of the camera can be controlled without causing an adverse influence to be imparted on the aperture opening characteristics of the shutter blades. Further, the present invention contemplates the use of the aforesaid member in combination with the release member for locking of the release member. Therefore, it is possible to provide a camera capable of release lock by way of a very simple structure.

Another of the features of the present invention is that the motor driven winding-up device of such construction as described above, is provided with an arrangement of a clutch mechanism constituting part of the driving torque transmission to the takeup spool, such that when switching to the rewinding mode, the clutch mechanism is uncoupled as the above-defined member takes action, and this condition is maintained until a camera release is actuated. This gives rise to an additional advantage that when exchanging the film cartridge, the spool plays without restriction from rotation, thus enabling the operator to take the cartridge out of the camera without difficulties even when the film leader is left convoluted on the spool. It is also possible in such case to prevent such accidental occurences such as drawing of the film from the cartridge entirely.

What is claimed is:

1. A motor driven winding-up device for a camera with a shutter including:
   (a) an electric motor;
   (b) a spool arranged to be driven by said motor for winding up film in the camera;
   (c) clutch means for transmitting driving torque of said motor to said spool so that said spool is driven to rotate when said clutch means is actuated, said clutch means being placed in a non-actuated state when a film is wound up by a length of one frame;
(d) switching means for controlling a supply of current to said motor when said switching means is actuated, said switching means being placed in a non-actuated state corresponding to completion of energizing the shutter;
(e) an actuating member for selectively actuating said clutch means and said switching means by shifting in a prescribed direction; and
(f) a latch member engageable with said actuating member, and arranged to be disengaged from said actuating member when operation of the shutter is completed, for initiating shifting of said actuating member.

2. A device according to claim 1, wherein said latch member is supported in a freely rotatable manner and is rotated corresponding to completion of the operation of the shutter so as to release engagement thereof with said actuating member.

3. A device according to claim 2, wherein said latch member is biased in a direction for engaging said actuating member.

4. A device according to claim 3, wherein said latch member is arranged to rotate by contacting an element associated with the shutter when the operation of the shutter is completed.

5. A motor driven winding-up device for a camera including:
(a) an electric motor;
(b) a spool arranged to be driven by said motor for winding up film in the camera;
(c) clutch means for transmitting driving torque of said motor to said spool so that said spool is driven to rotate when said clutch means is actuated;
(d) switching means for controlling a supply of current to said motor when said switching means is actuated;
(e) an actuating member for selectively actuating said clutch means and said switching means;
(f) a latch member for latching said actuating member, said latch member being arranged to be disengaged from said actuating member when an exposure operation of the camera is terminated;
(g) a release member operating in response to actuation of a camera release operation; and
(h) a lock member arranged to be engageable with said release member for preventing movement of said release member, said lock member being arranged to be disengaged from said release member as said actuating member engages said latch member.

6. A device according to claim 5, wherein said motor driven winding-up device for a camera further includes:
(a) a response member, said member being actuated by said latch member; and
(b) bias means, said means transmitting the action of said response member to said lock member.

7. A motor driven winding-up device for a camera including:
(a) an electric motor;
(b) a spool arranged to be driven by said motor for winding up film in the camera;
(c) clutch means for transmitting driving torque of said motor to said spool so that said spool is driven to rotate when said clutch means is actuated;
(d) switching means for controlling a supply of current to said motor when said switching means is actuated;
(e) a first actuating member for actuating said switching means;
(f) a first latch member for latching said first actuating member;
(g) a second actuating member responsive to release of said first actuating member and said first latch member from engagement with each other, for actuating said clutch means in a direction toward a transmitting state;
(h) a rewind control member for releasing said first latch member and said first actuating member from engagement with each other; and
(i) a third actuating member cooperative with said rewind control member for latching said second actuating member.

8. A device according to claim 7, wherein said motor driven winding-up device for a camera further includes:
(a) a second latch member engaging said third actuating member when said third actuating member is actuated by said rewind control member.

9. A device according to claim 8, wherein said motor driven winding-up device for a camera further includes:
(a) a release member operating in response to actuation of a camera release operation; and
(b) a lock member arranged to be engageable with said release member for preventing movement of said release member, said lock member being arranged to be disengaged from said release member when said first actuating member engages said first latch member.

10. A device according to claim 9, wherein said second latch member and said third actuating member are released from engagement with each other by the action of said release member.

* * * * *